Feb. 14, 1961 E. GRASWICH ET AL 2,971,452
GREASE EXTRACTING ATTACHMENT FOR
VENTILATORS FOR KITCHEN RANGES
Filed Aug. 11, 1958 6 Sheets-Sheet 1
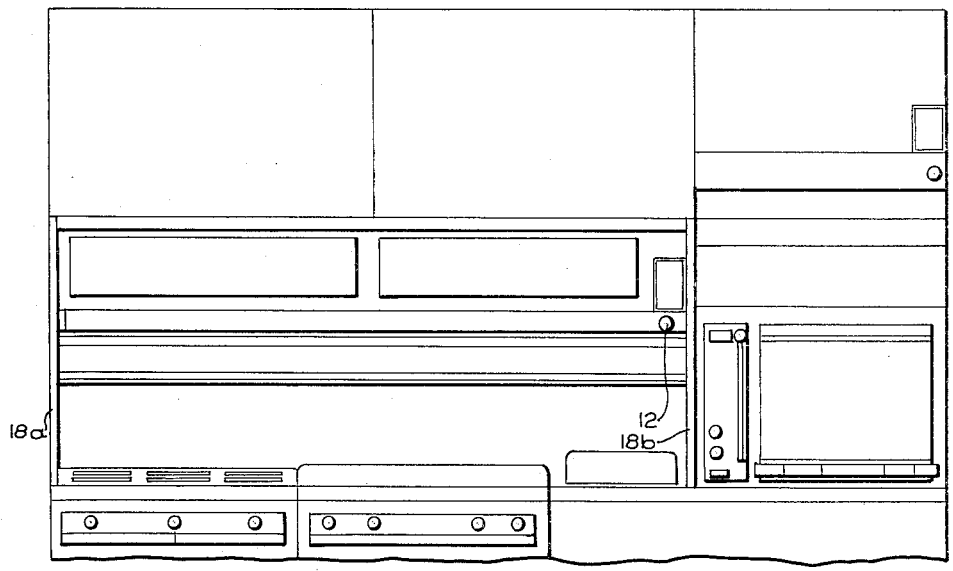
FIG_1
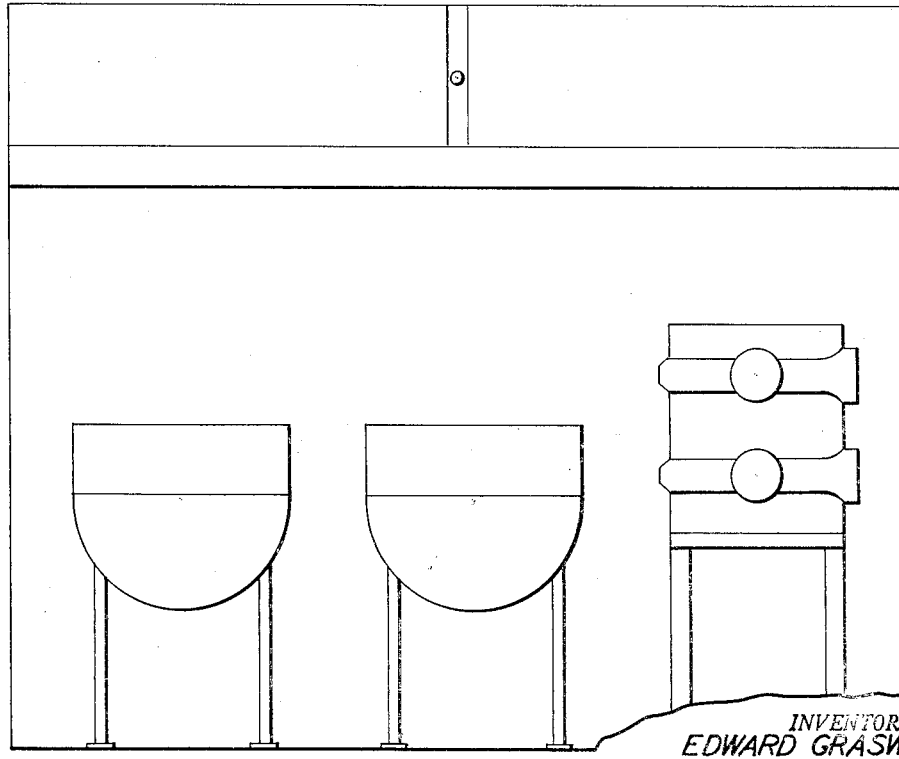
FIG_2
INVENTORS
EDWARD GRASWICH
JACK W. CEDARQUIST
BY
ATTORNEYS

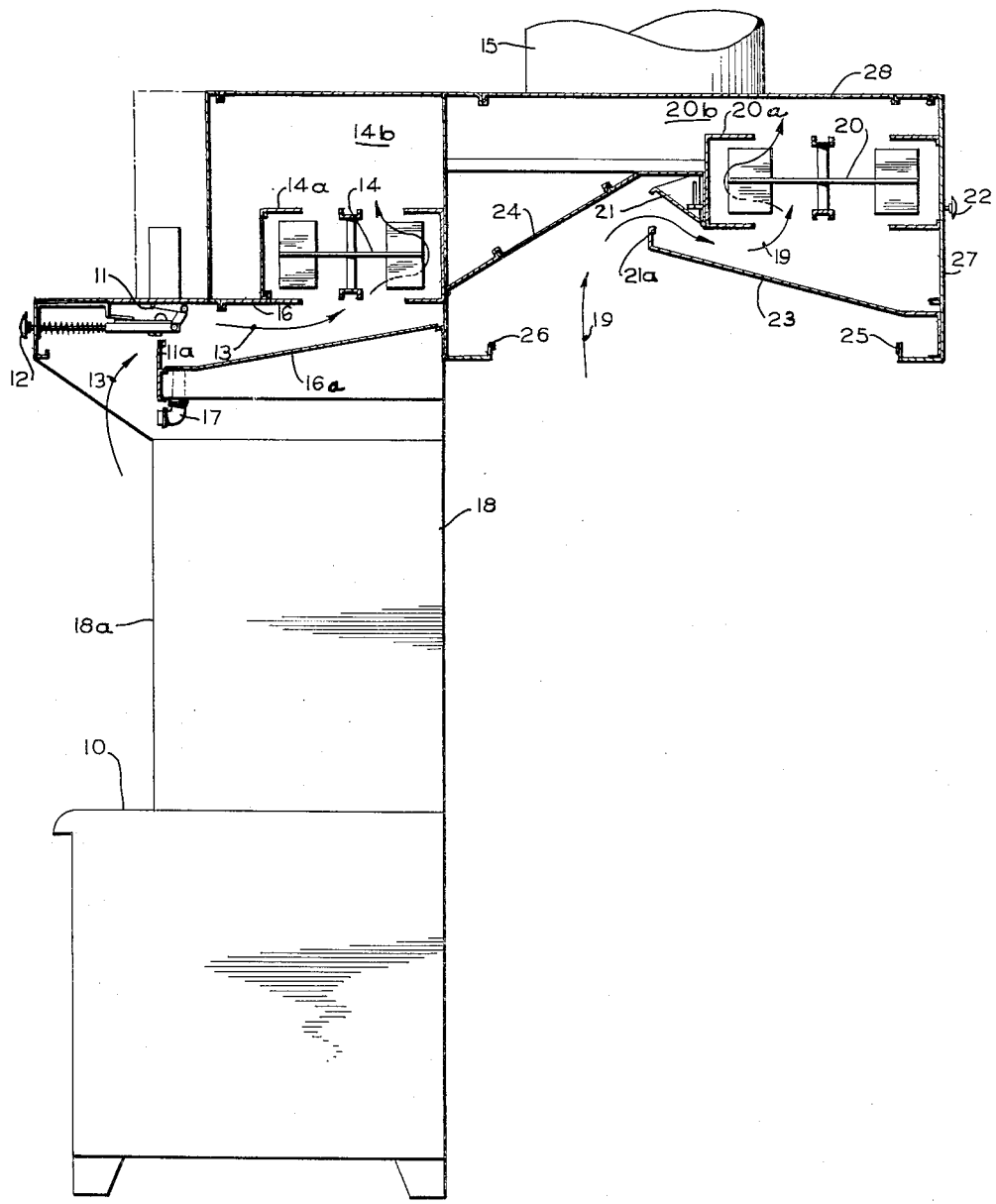
FIG_3
INVENTORS
EDWARD GRASWICH
JACK W. CEDARQUIST
BY
ATTORNEYS

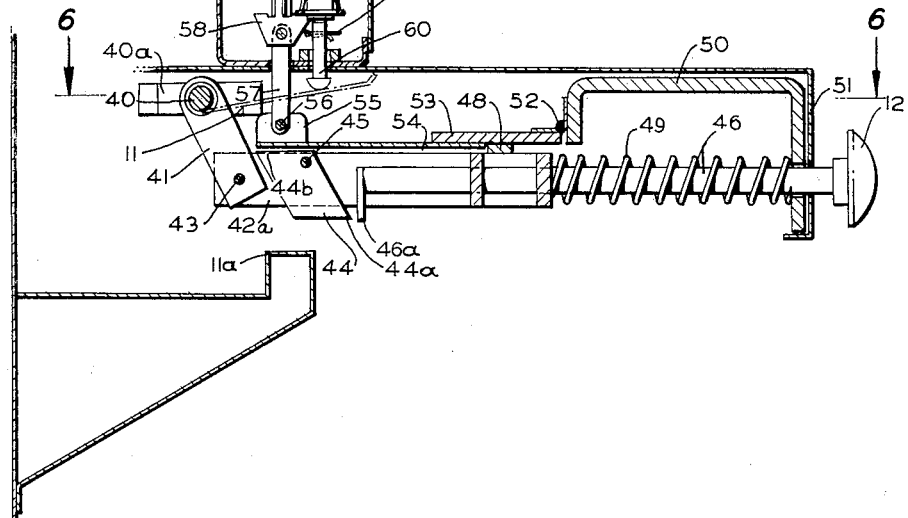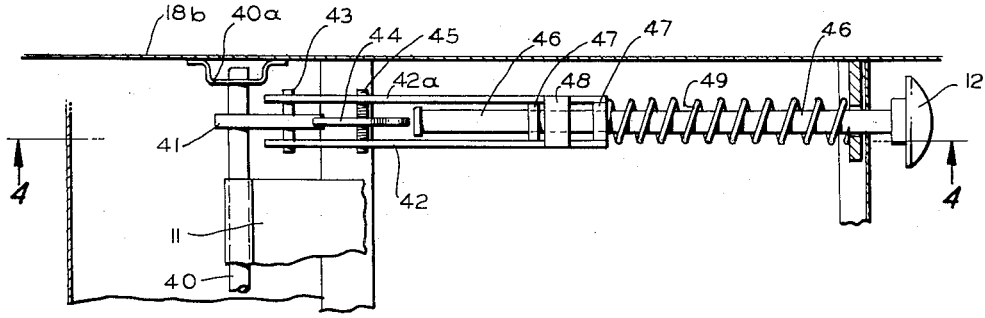

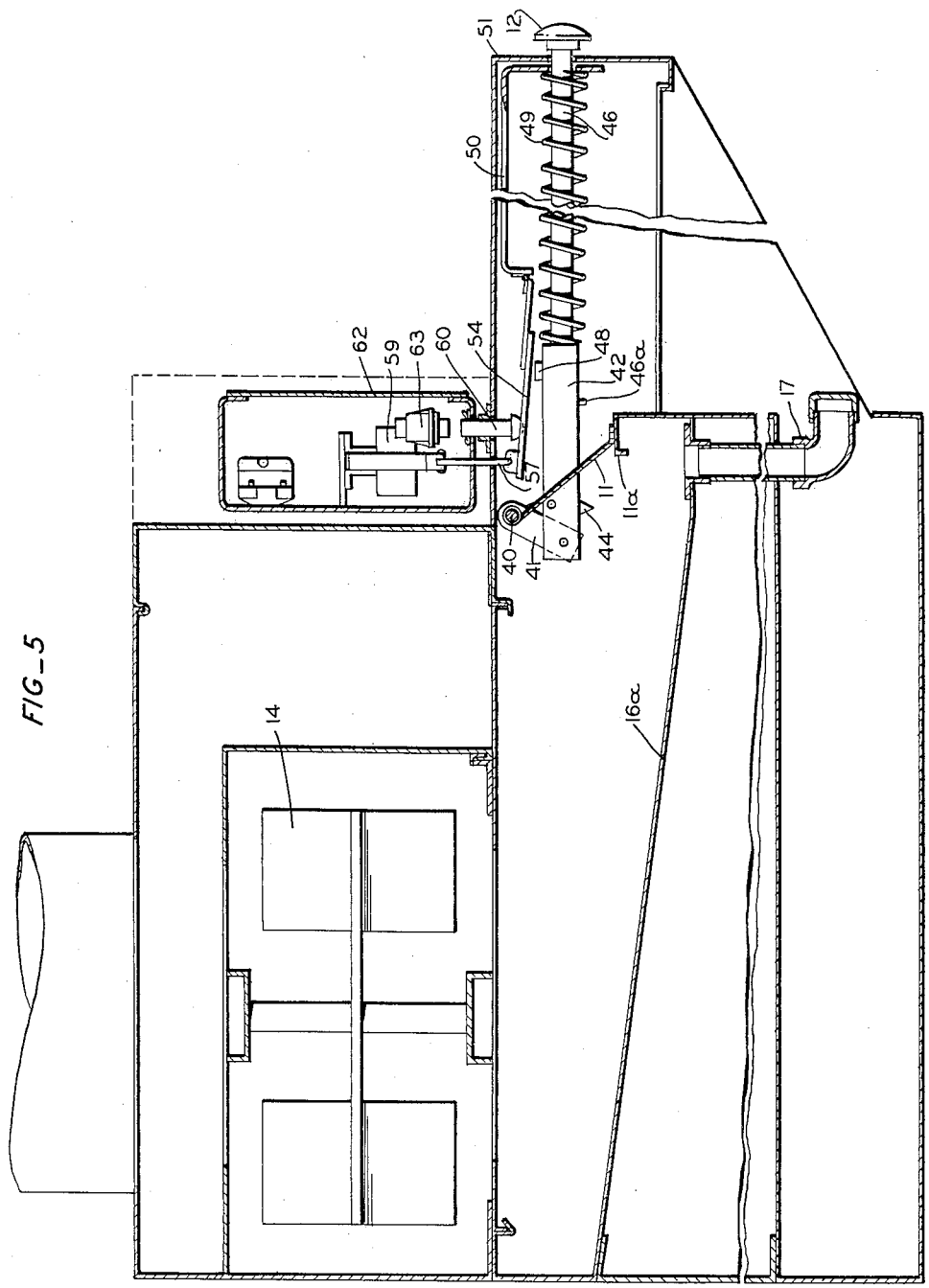

Feb. 14, 1961 E. GRASWICH ET AL 2,971,452
GREASE EXTRACTING ATTACHMENT FOR
VENTILATORS FOR KITCHEN RANGES
Filed Aug. 11, 1958 6 Sheets-Sheet 5
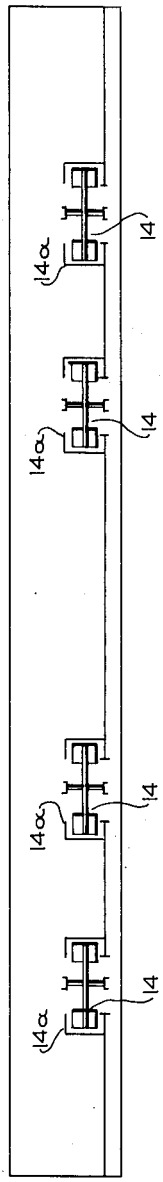
FIG_7
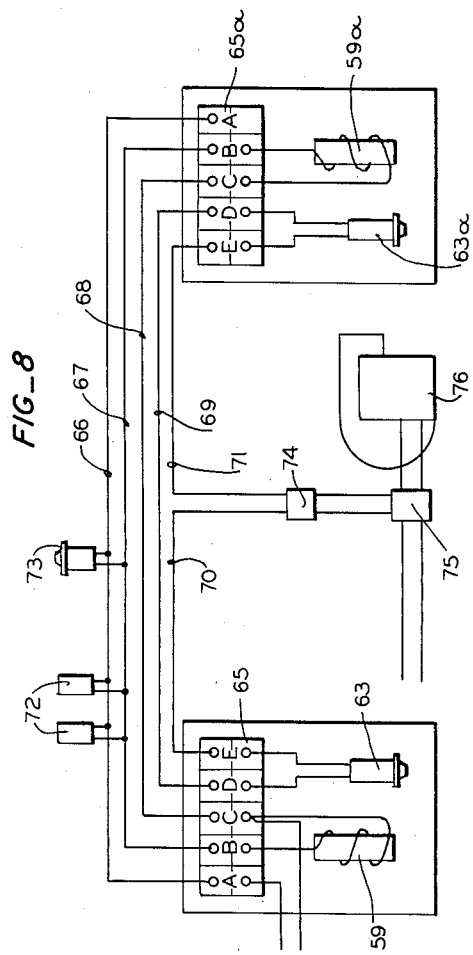
FIG_8
INVENTOR.
EDWARD GRASWICH
BY JACK W. CEDARQUIST
ATTORNEYS

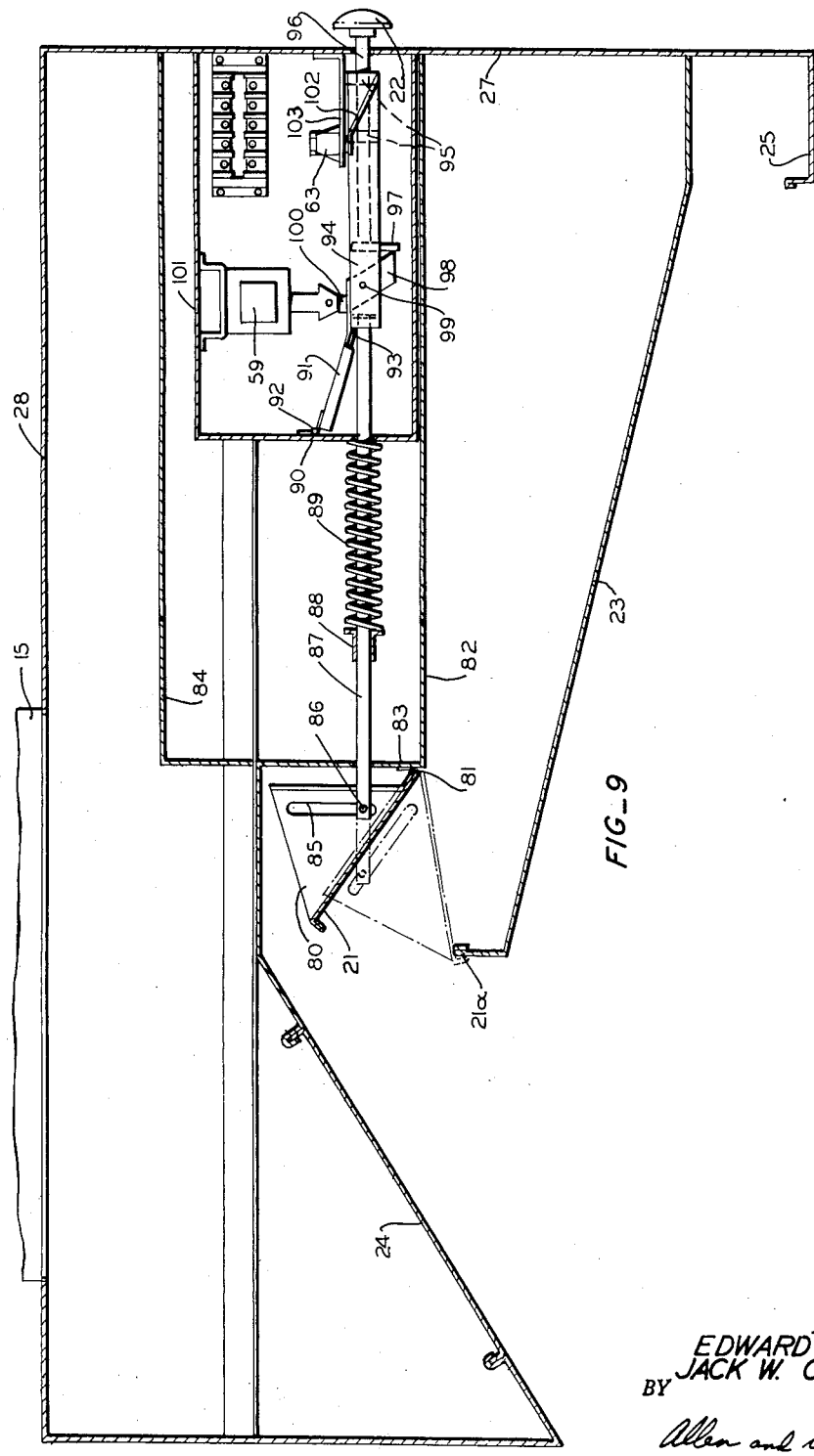

United States Patent Office 2,971,452
Patented Feb. 14, 1961

2,971,452
GREASE EXTRACTING ATTACHMENT FOR VENTILATORS FOR KITCHEN RANGES

Edward Graswich and Jack W. Cedarquist, San Francisco, Calif., assignors to Dohrmann Hotel Supply Co., San Francisco, Calif., a corporation of Nevada Filed Aug. 11, 1958, Ser. No. 754,374

5 Claims. (Cl. 98—115)

This invention relates to ventilator apparatus for exhausting cooking gases from cooking surfaces in general. More particularly this invention relates to ventilator apparatus in which manually or automatically controlled means is provided for substantially eliminating or preventing the occurrence of fires in the ventilator passage caused by burning of the cooking gases that are being exhausted.

This application is a continuation in part of our application Serial No. 707,175 filed January 6, 1958.

An object of this invention is to provide an improved ventilator structure for use with cooking ranges, said ventilator having means to reduce hazards from fires igniting the gases being exhausted thereby.

Still another object of this invention is to provide an improved ventilator structure for use with cooking ranges, said structure having a fire door positioned in the lower part thereof so that the entire ventilating stack interior is closed at the bottom vent thereof whereby no grease collecting parts thereof are exposed in case of fire in the cooking areas.

A further object of this invention is to provide an improved fire door arrangement to the bottom portion of the ventilator passage for cooking ranges, said door being provided with both manually and automatically actuated closing means of simple construction for sealing off of the bottom vent of the ventilating structure in case of fire.

Still a further object of this invention is to provide an improved leverage which may be either manually or electrically controlled for closing ventilator doors provided to ventilator ducts for exhausting cooking gases.

Other and further objects of this invention will be apparent to those skilled in the art to which this invention relates from the following specification, claims and drawing.

In accordance with this invention there is provided an improved arrangement for controlling the operation of doors, such as, fire doors associated with the lower end of the ventilator passage employed for exhausting cooking gases from cooking surfaces of ranges. With this arrangement the entire passage is closed when the door is closed so that no grease covered surfaces of the passage are exposed. These doors are provided with spring loaded operating leverages that may be controlled or tripped either manually or electrically so that they function to close the fire door, the same operating leverage being employed for manually opening the door.

Where the door operating leverage is adapted to be tripped or unlatched by electrical means the leverage may also be provided with an electrical switch actuating member that controls the electrical circuit to the ventilator blower whereby this circuit is interrupted when the fire door is closed. Where only manual control of the door is provided and a blower is employed in the ventilator, the same switch actuating member for automatically controlling the circuit of the blower motor, when the door operating leverage is tripped, may be employed, or a manually controlled switch may be provided for this purpose.

Further details of this invention will be set forth in the following specification, claims and drawing in which briefly:

Figure 1 is a view in front elevation of a broiler canopy employing this invention;

Figure 2 is an elevation view of another canopy employing this invention;

Figure 3 is a sectional view taken through the canopies shown in Figures 1 and 2;

Figure 4 is a sectional view of one embodiment of fire door closing arrangement showing the door open;

Figure 5 is a sectional view of the fire door operating mechanism showing the door closed.

Figure 6 is a sectional view taken along the line 6—6 of Figure 4;

Figure 7 is a sectional view of a part of the ventilator structure showing a plurality of rotatable vane structures;

Figure 8 is a schematic wiring diagram; and

Figure 9 is a detail sectional view showing another form of fire door closing mechanism.

Referring to the drawing in detail, there are shown in Figures 1, 2 and 3 elevational views of a hood and broiler canopy structure embodying features of this invention. The cooking surface 10 is positioned in the broiler canopy so that the gases released in the cooking processes pass upward through suitable long and narrow vents controlled by one or more fire doors 11 having a similar long and narrow configuration and the gases flow through these vents as indicated by the flow lines 13. These fire doors 11 are supported on the wall structure as will be described hereinafter and they are controlled by a leverage that is provided with a handle 12 extending to the front of the canopy so that the doors 11 may be lowered to engage the lip formed at the top of the baffle 11a when it is desired to close the vents.

The gas passes upward through a rotatable vane structure 14 which is similar to the vane structure disclosed in U.S. Patent No. 2,793,712 issued on May 28, 1957. This vane structure is positioned in a box-like cavity having an opening at the bottom for receiving the gases and an opening at the top through which the gases pass outward into the upper cavity 14b that is formed by suitable wall structure in the upper part of the canopy, and this cavity 14b is provided with openings (not shown) whereby gases collected therein may be exhausted to the stack 15 that is connected to the upper wall 28. The stack 15 extends upward and is open to the atmosphere and a suitable exhaust fan that is driven by an electric motor (not shown) is provided therein for the purpose of drawing the gases out of the canopy and hood structure and exhausting said gases to the outer atmosphere.

As the gases travel upward to the vane structure 14 above the wall structure 16 some of the grease will condense from the gases and these greases will collect on walls 16 and 16a. The wall 16a is inclined downward to a trough which drains to the drain pipe 17 that is provided with a closure cap at the lower end thereof which may be removed and the grease drained from the trough into a suitable container. This trough is positioned at the lower end of the vent structure behind the wall 11a so that it may be sealed when the door 11 is closed and in this way any grease collected in the trough will not be exposed to gases accidentally ignited on the cooking surface.

The hood structure shown in the right hand portion of Figure 3 is provided with a fire door 21 that cooperates with the lip 21a of the inclined baffle 23 to provide a vent through which the gases may enter the hood structure as indicated by the flow lines 19. The door 21 is controlled by a leverage such as shown in detail in Figure 9 and this leverage is provided with a handle 22 that extends to the front of the hood on the outside of the front wall 27. A rotatable vane structure 20 is provided on one side of the door operating leverage. This vane structure 20 is similar to the vane structure 14 and is also of the type disclosed in Patent No. 2,793,712, issued on May 28, 1957. This rotatable vane structure is positioned in a box-like cavity 20a having an opening in the bottom thereof through which the gases enter. A similar opening is provided in the top of the cavity 20a through which the gases are exhausted therefrom into the cavity 20b that is connected to the stack 15.

The hood structure is provided with a trough 25 that is adapted to collect greases that condense from the cooking gases on the lower surface of the inclined baffle 23 and which greases flow down this baffle into this trough. A similar trough 26 is provided to the hood adjacent to the rear wall 18 and this trough is adapted to collect greases that condense on the lower surface of the inclined baffle 24 and flow down this surface.

In practice where relatively long canopy and hood arrangements are employed, it is desirable to provide several of the rotatable vane structures such as the structures 14 and 20 at spaced intervals as shown in Figure 7.

This view shows an arrangement providing four box-like cavities that may be used for four vane structures 14 or four vane structures 20. The cavity below the vane structures is open to receive the cooking gases and the inlet thereto is controlled by doors similar to the doors 11 and 21 and the large cavity above the vane structures is open to the stack.

The mechanism for controlling the fire door 11 of the canopy shown in Figure 3 is illustrated in detail in Figures 4, 5 and 6. The door 11 is attached to the rod or shaft 40 by brazing, welding or by means of suitable bolts or screws so that the door may be rotated by rotation of the shaft. This shaft is supported at the ends thereof by suitable bearings such as the bearing member 40a shown in Figure 5 and these bearing members may be attached by welding, bolts or the like to the canopy side walls such as the side walls 18a and 18b. Additional bearing members may be provided to intermediate portions of the shaft 40 if this shaft is of considerable length. An actuating member 41 is fixedly attached to the shaft 40 near one end thereof, for example, near the canopy side wall 18b as shown in Figure 6. This actuating member 41 is pivotally attached to the elongated members or bars 42 and 42a by means of the pivot pin 43. These bars 42 and 42a are held in spaced relation by the members 47 which are attached thereto near one end thereof and which are provided with suitable holes in which the rod 46 is slidably positioned. A depending member 46a is attached to the left hand end of the rod 46 and this depending member may be brought into engagement with the forward pointed end 44a of the trip member 44 which is pivotally supported on the bars 42 and 42a by the pivot pin 45 so that this trip member is held in alignment with the depending member 46a and also so that the upper cam portion 44b of the trip member 44 is positioned under the latch member 54. The right hand portion of the latch member 54 is attached to the member 53 which is pivotally attached by the spring biased hinge 52 to the support 50. The support 50 is of angular configuration and is formed to fit into the wall structure 51 to which it is attached.

Thus the bars 42 and 42a and rod 46 form a telescoping elongated member or means which may be used to open the door manually by pulling on the knob 12 to expand this telescoping member until the depending member 46a attached to the inner end of the rod 46, engages the inner one of the cross pieces 47.

The coil spring 49 is positioned on the rod 46 and one end of this spring is in engagement with the outer cross piece 47 that is attached to the bar members 42 and 42a and the other end of this coil spring is in engagement with a surface of the support 50 that is provided with a hole through which the rod 46 extends as shown in Figures 4 and 5. The bar members 42 and 42a are provided with an additional cross piece 48 which is engaged by the right hand end of the latch member 54 to prevent the spring 49 from moving the bar members 42 and 42a to the left unless these members are released by the aforesaid latch member. The left hand end of the latch member 54 may be lifted so that its right hand end releases the catch 48 either manually or by means of an electrical control.

Manual lifting of the latch member is accomplished by pressing on the handle 12 that is attached to the rod 46 thereby contracting the telescoping member including the members 42, 42a and rod 46, until the depending member 46a engages the forward part 44a of the trip 44 and moves this trip clockwise on the pivot 45. Thus the portion 44b of the trip engages the underside of the left hand portion of the latch 54 and swings the latch upward on its pivot 52 thereby causing the latch member 54 to release the catch 48 whereupon the spring 49 moves the bar members 42 and 42a to the left and rotates the member 41 and the shaft 40 so that the door 11 is turned downward into its closed position in which it engages the upper surface of the baffle 11a and closes the vent or opening at the bottom of the ventilator structure.

The latch member 54 may also be lifted by the electrical mechanism that comprises the electromagnetic device 59 which is provided with an armature of magnetic material that may be partially pulled into the winding of the device when said winding is electrically energized. The armature 58 is pivotally connected to the rod 57 in the lower end of which is attached by the pin 56 to the upright member 55 of the latch member 54. The electromagnetic device 59 and the blower motor cut out switch 63 are positioned in a housing 62 above the door operating mechanism so that the rod 57 may be conveniently extended through suitable holes formed in this housing and in the cover of the door operating mechanism. The switch 63 is also provided with an actuating member 60 that is provided with a pin 61 which engages the sides of the hole in the housing through which this member extends and prevents this member from falling out of said housing. The lower end of the member 60 is adapted to be engaged by the door 11 when said door is in open position as shown in Figure 4 so that the switch 63 is actuated and the blower motor which is positioned in the stack is turned on. The switch 63 and electromagnetic device 59 are connected as shown in the wiring diagram illustrated in Figure 8.

This wiring diagram shows a pair of electromagnetic devices 59 and 59a and a pair of switches 63 and 63a which are connected to individual terminal boards 65 and 65a and this arrangement may be employed for controlling a pair of door operating mechanisms as shown in Figure 3 that may be provided to a single ventilator structure and blower arrangement.

The wiring diagram illustrates a pair of terminal blocks 65 and 65a, each having five terminal positions A, B, C, D and E, and each of these terminal positions includes an upper terminal and a lower terminal. Each of these terminal blocks may be positioned in a housing such as the electromagnetic device housing 62 and it may be associated therein with the particular electromagnetic device 59 and switch 63 that are connected to selected lower terminals thereof. The lower terminals A and C of the block 65 are connected to a suitable source of current supply such as the conventional 115 v. supply. One side of the device 59 is also connected to the lower terminal C and the other side of this device is connected to the lower terminal B. The lower terminals D and E are connected to the blower cut-out switch 63. In the case of the terminal block 65a, the lower terminals B and C are connected to the electromagnetic device 59a and the lower terminals D and E are connected to the switch 63a. The upper terminals A and B of each of the blocks 65 and 65a are connected together by the conductors 66 and 67 and the thermostats 72 are bridged across these conductors as shown. The manual switch 73 is also bridged across these conductors. Accordingly, when either of the thermostatic switches 72 or the manual switch 73 are closed the circuits between the 115 v. current supply and the windings of the devices 59 and 59a are closed.

The upper terminal C of the blocks 65 and 65a are connected together by the conductor 68, also the upper terminals D are connected together by the conductor 69. The upper terminals E of the blocks 65 and 65a are connected to the respective upper terminals of the blower control switch 74 by the conductors 70 and 71, respectively. The lower terminals of this switch 74 are connected to the magnetic switch 75 which is connected to the 110 v., 220 v. source of supply, and to the blower motor 76. The blower motor 76 and the blower associated therewith are positioned to provide a forced draft through the passage of the ventilator structure and for this purpose they may be located at any desirable point along the stack 15 forming this passage.

The thermostats 72 are located on the lower parts of the hood or canopy where they would be most likely to be affected by ignited cooking gases so that they can function immediately to energize the door closing mechanism which is instrumental in turning off the blower motor and in closing the draught through the stack. Furthermore the operator can by closing the manual switch 73 cause the electromagnetic device 59 to unlatch the door closing mechanism or he can accomplish this by pressing on the handle 12 which also unlatches the door closing mechanism.

In Figure 9 there is shown a detail view of the door control employed in the broiler hood shown in Figure 3. The back wall structure shown in this view may be coincident with or the same as the wall 18 of the hood structure shown in Figure 3 and both hood structures open into the same stack 15. This hood is provided with a top wall 28 and a front wall 27. The front wall terminates in a trough 25 and slightly above this trough there is provided an inclined wall 23 which terminates in a vertical section that defines one of the lips 21a of the opening that is adapted to be closed by the door 21 which is provided with a vertical triangular member 80. The door 21 is supported by the hinge 81 on the corner of the horizontal wall 82 and vertical wall 83. The horizontal wall 82 extends from the door 21 to the front wall 27.

The door operating mechanism which will be described in detail hereinafter, is positioned between the horizontal walls 82 and 84 which extend between the front wall 27 and the wall 83. While the walls 82 and 84 are shown joined to these walls 27 and 83, they may be provided with wall extensions positioned behind the front wall 27 and in front of wall 83 to form the front and back of the rotor housing 20a that is positioned just behind this door operating mechanism and in cases where the bottom and top of this housing are extensions of the walls 82 and 84 respectively.

The rotatable vane structure 20 shown in Figure 3 is adapted to be positioned in a housing having a bottom wall and a top wall which may be extensions of the walls 82 and 84, although they may be separate. The vane structure 20 may be positioned either in the front of the door operating mechanism illustrated in Figure 3 or it may be positioned in back of the mechanism shown in Figure 9. In other words it may be located in between a pair of the rotors shown in Figure 7.

The member 80 that is attached to the door 21 is provided with an elongated slot 85 in which the pin 86 carried by the actuating rod 87 is positioned. The rod 87 is provided with a collar 88 that engages one end of the compression spring 89 which is positioned between this collar and the wall 90 through which the rod 87 extends.

The wall 90 defines a compartment in which are positioned the door latching and trip mechanisms including the relay 59 and the blower cut-out switch 63. The latch 91 is supported on the wall 90 by a spring hinge 92 and this latch carries a member 93 that is adapted to engage the forward end of the members 94, which forward end is attached to the rod 87. The members 94 comprise a pair of strip members that are held together by bearing members 95 in which the rod 96 is slidably supported between said strip members. The rod 96 is provided with a trip member 97 which is fixedly attached to said rod and is adapted to engage the forward portion of the trip lever 98 that is pivotally attached to the members 94 by the pin 99. The rod 96 is also provided with an actuating handle 22 that is positioned on the outside of the wall 27.

The latch 91 is provided with an extension to which the upstanding member 100 is attached and this member is pivotally attached to the armature of the relay 59 which is supported by a suitable bracket attached to the top wall portion 101 of the compartment. One of the strip members 94 is provided with a switch actuating member 102 which is shaped with a horizontal portion and an inclined portion for the purpose of actuating the switch 63 when the members 94 are shifted laterally. The switch 63 is supported on the bracket 103 that is attached to the wall 27.

The inclined wall 23 is positioned below the rotatable vane structure and as a result grease will collect on this wall. In order to facilitate removal of the grease collected, this wall may be made removable. It may be provided with an angular extension extending down into the trough 25 to hold it in place. On the other hand the wall 23 may be provided with a door similar to the door 24 in the inclined opposite wall. The door 24 is provided with edge flanges that are frictionally held in a groove formed around the door opening.

The door 21 may be opened by pulling the rod 96 outward by gripping the handle 22 and when this is done the pin 86 carried by the rod 87 slidably engages the member 80 in the slot 85. Thus when the door 21 is closed this pin is in the upper end of the slot 85 as shown by the broken lines and when the door is open it is in the lower end of this slot as shown in Figure 9. When the door is open the spring 89, that is positioned on the rod 87 between the collar 88 and the wall 90, is compressed. The door is held open and the spring 89 is held compressed by the latching member 93 which engages the end of the members 94 and thus prevents the spring 89 from closing the door 21 until this latch member is released. Releasing the latch member may be accomplished manually by pressing the handle 22 and causing the rod 96 to press the trip member 97 against the lever 98 thereby lifting the latch member 93 clear of the ends of the members 94; or releasing the latch member may be accomplished by energizing the relay 59 thereby causing this relay to lift its armature and the latch member 93.

Releasing the latch member permits the spring 89 to close the door 21 and at the same time the members 94 are shifted to left whereupon the switch controlling member 102 is also moved to the left thereby permitting the switch 63 to be opened to cut off the blower motor as previously described in connection with the description of the wiring diagram.

While we have shown and described a preferred manner of carrying out our invention, and a preferred apparatus for the same purpose, the invention is obviously capable of modification and variation from the form shown so that the scope thereof should be limited only by the scope of the claims appended hereto.

We claim:

1. In a ventilator structure adapted to be used for exhausting gases from cooking ranges the combination of a wall structure having means for defining a cooking gas exhausting passage therethrough, a door for closing the lower end of said passage to cut off air circulation from said passage in case the cooking gases are accidentally ignited in the cooking surface of the range, means for rotatably supporting said door on said wall structure so that the distinctive open and closed positions of said door are each easily visible and recognizable by the operator of said cooking range while operating said range, said means including a shaft fixedly attached to said door, operating means for opening and closing said door, said operating means comprising a lever having one end fixedly attached to said shaft, a pair of elongated telescoping members, bearing means for slidably mounting one of said elongated members on the other of said members, means for pivotally connecting said one of said members to the free end of said lever, a hand grip connected to the free end of said other member, means for slidably supporting the forward member of said elongated members on said wall structure so that said hand grip extends out in front of said wall structure, stop means on the inner end of said other member for limiting the outward extension of said other member when said door is being opened, a spring mounted on said other member for urging said members into their extended position, holding means comprising a lug on said one member and a member pivotally mounted on said supporting means for engaging said lug and for holding said door in open position, and means mounted on said one member adapted to be engaged by said stop means for moving said pivotally mounted member to disengage it from said lug and permit said spring to urge said door into its closed position.

2. In a ventilator structure adapted to be used for exhausting gases from cooking ranges the combination of a wall structure having means for defining a cooking gas exhausting passage therethrough, a door for closing the lower end of said passage to cut off air circulation from said passage in case the cooking gases are accidentally ignited in the cooking surface of the range, means for rotatably supporting said door on said wall structure so that the distinctive open and closed positions of said door are each easily visible and recognizable by the operator of said cooking range while operating said range, said means including a shaft fixedly attached to said door, operating means for opening and closing said door, said operating means comprising a lever having one end fixedly attached to said shaft, a pair of elongated telescoping members, bearing means for slidably mounting one of said elongated members on the other of said members, means for pivotally connecting said one of said members to the free end of said lever, a hand grip connected to the free end of said other member, a supporting member for slidably supporting the forward member of said elongated members on said wall structure so that said hand grip extends out in front of said wall structure, stop means on the inner end of said other member for limiting the outward extension of said other member when said door is being opened, a spring positioned between said bearing means and said supporting member for urging said members into their extended position, holding means comprising a lug on said one member and a member having one end pivotally mounted on said supporting means for engaging said lug for holding said door in open position, and means pivotally mounted on said one member, said last mentioned means being adapted to be engaged by said stop means and moved into engagement with the free end portion of said pivotally mounted member to disengage it from said lug and permit said spring to urge said door into its closed position.

3. In a ventilator structure adapted to be used for exhausting gases from cooking ranges the combination of a wall structure having means for defining a cooking gas exhausting passage therethrough, a door for closing the lower end of said passage to cut off air circulation from said passage in case the cooking gases are accidentally ignited in the cooking surface of the range, means for rotatably supporting said door on said wall structure so that the distinctive open and closed positions of said door are each easily visible and recognizable by the operator of said cooking range while operating said range, said means including a shaft fixedly attached to said door, operating means for opening and closing said door, said operating means comprising a lever having one end fixedly attached to said shaft, telescoping means comprising a pair of elongated members and a rod, bearing means for said rod attached to said elongated members, said elongated members being positioned side by side and said rod being adapted to slide in said bearing means therebetween, means for supporting said telescoping means on said wall structure so that said rod projects outward therefrom; a handle attached to the projecting end of said rod for extending said telescoping means when said door is to be opened, a spring supported by said telescoping means, said spring urging said telescoping means into its door closed position, a locking member attached to said telescoping means, a pivoted latching member pivotally supported on said wall structure, said latching member being adapted to engage said locking member to hold said telescoping means in its door open position and means for releasing said latching member to permit said spring and telescoping means to close said door, said last mentioned means comprising a pivoted member pivotally supported between said pair of elongated members and means on said rod for causing said pivoted member to move said latching member from said locking member when said rod is moved further in between said pair of elongated members.

4. In a ventilator structure adapted to be used for exhausting gases from cooking ranges the combination of a wall structure having means for defining a cooking gas exhausting passage therethrough, a door for closing the lower end of said passage to cut off air circulation from said passage in case the cooking gases are accidentally ignited in the cooking surface of the range, means for rotatably supporting said door on said wall structure so that the distinctive open and closed positions of said door are each easily visible and recognizable by the operator of said cooking range while operating said range, said means including a shaft fixedly attached to said door, operating means for opening and closing said door, said operating means comprising a lever having one end fixedly attached to said shaft, a pair of elongated telescoping members, bearing means for slidably mounting one of said elongated members on the other of said members, means for pivotally connecting said one of said members to the free end of said lever, a hand grip connected to the free end of said other member, means for slidably supporting the forward member of said elongated members on said wall structure so that said hand grip extends out in front of said wall structure, stop means on the inner end of said other member for limiting the outward extension of said other member when said door is being opened, a spring mounted on said other member for urging said members into their extended position, holding means comprising a lug on said one member and a member pivotally mounted on said supporting means for engaging said lug for holding said door in open position, and electromagnetic means mounted on said wall structure having means connected to said pivotally mounted member for moving said pivotally mounted member when said electromagnetic means is energiezd to disengage said pivotally mounted member from said lug and permit said spring to urge said door into its closed position.

5. In a ventilator structure adapted to be used for exhausting gases from cooking ranges the combination of a wall structure having means for defining a cooking gas exhausting passage therethrough, a door for closing the lower end of said passage to cut off air circulation from said passage in case the cooking gases are accidentally ignited in the cooking surface of the range, means for rotatably supporting said door on said wall structure so that the distinctive open and closed positions of said door are each easily visible and recognizable by the operator of said cooking range while operating said range, said means including a shaft fixedly attached to said door, operating means for opening and closing said door, said operating means comprising a lever having one end fixedly attached to said shaft, a pair of elongated telescoping members, bearing means for slidably mounting one of said elongated members on the other of said members, means for pivotally connecting said one of said members to the free end of said lever, a hand grip connected to the free end of said other member, means for slidably supporting the forward member of said elongated members on said wall structure so that said hand grip extends out in front of said wall structure, stop means on the inner end of said other member for limiting the outward extension of said other member when said door is being opened, a spring mounted on said other member for urging said members into their extended position, holding means comprising a lug on said one member and a member pivotally mounted on said supporting means for engaging said lug and for holding said door in open position, means mounted on said one member and adapted to be engaged by said stop means for moving said pivotally mounted member and disengaging it from said lug to permit said spring to urge said door into its closed position, an exhaust blower in the stack of the ventilator driven by an electric motor, and a switch for controlling said electric motor mounted on said wall structure so that said switch is closed when said door is open so that said motor may be energized only when said door is open.

References Cited in the file of this patent

UNITED STATES PATENTS

| | | |
|---|---|---|
| 2,548,406 | Sonntag | Apr. 10, 1951 |
| 2,702,325 | Ferraris | Feb. 15, 1955 |
| 2,759,054 | Goudy et al. | Aug. 14, 1956 |
| 2,813,477 | Gaylord | Nov. 19, 1957 |
| 2,862,437 | Smith et al. | Dec. 2, 1958 |